US012692345B2

(12) United States Patent
Kim et al.

(10) Patent No.: US 12,692,345 B2
(45) Date of Patent: Jul. 28, 2026

(54) METHOD FOR PREPARING A COPOLYESTER

(71) Applicant: HANWHA SOLUTIONS CORPORATION, Seoul (KR)

(72) Inventors: Eung Gyu Kim, Daejeon (KR); Ho Seong Nam, Daejeon (KR); Kyoung Won Yim, Daejeon (KR); Ju Mi Yun, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 637 days.

(21) Appl. No.: 18/028,418

(22) PCT Filed: Aug. 11, 2021

(86) PCT No.: PCT/KR2021/010685
§ 371 (c)(1),
(2) Date: Mar. 24, 2023

(87) PCT Pub. No.: WO2022/065686
PCT Pub. Date: Mar. 31, 2022

(65) Prior Publication Data
US 2023/0357498 A1      Nov. 9, 2023

(30) Foreign Application Priority Data
Sep. 25, 2020      (KR) ........................ 10-2020-0124994

(51) Int. Cl.
| *C08G 63/692* | (2006.01) |
| *C08G 63/183* | (2006.01) |
| *C08G 63/199* | (2006.01) |
| *C08G 63/85* | (2006.01) |
| *C08K 5/098* | (2006.01) |
| *C08K 5/5333* | (2006.01) |

(52) U.S. Cl.
CPC ....... *C08G 63/6926* (2013.01); *C08G 63/183* (2013.01); *C08G 63/199* (2013.01); *C08G 63/85* (2013.01); *C08K 5/098* (2013.01); *C08K 5/5333* (2013.01)

(58) Field of Classification Search
None
See application file for complete search history.

(56) References Cited

U.S. PATENT DOCUMENTS

| 5,340,907 | A | * | 8/1994 | Yau | ........................ C08G 63/82 528/274 |
| 5,681,918 | A | | 10/1997 | Adams et al. | |
| 5,886,133 | A | † | 3/1999 | Hilbert | |
| 2001/0056173 | A1 | † | 12/2001 | Jeon | |
| 2003/0187151 | A1 | * | 10/2003 | Adams | .................... C08L 69/00 525/439 |
| 2004/0063864 | A1 | | 4/2004 | Adams et al. | |
| 2007/0248803 | A1 | † | 10/2007 | Kliesch | |
| 2008/0188602 | A1 | | 8/2008 | Jernigan | |
| 2010/0273956 | A1 | † | 10/2010 | Jenkins | |
| 2015/0141612 | A1 | | 5/2015 | Lee et al. | |
| 2015/0197598 | A1 | * | 7/2015 | Kim | .................... C08G 63/672 528/298 |
| 2016/0237207 | A1 | | 8/2016 | Ohashi et al. | |

FOREIGN PATENT DOCUMENTS

| CN | 101511907 A | 8/2009 |
| CN | 105585705 A | 5/2016 |
| CN | 107513154 A | 12/2017 |
| EP | 1548048 A1 | 6/2005 |
| JP | 2000-504770 A | 4/2000 |
| JP | 2001-323054 A | 11/2001 |
| JP | 2003-040994 A | 2/2003 |
| JP | 2003-171455 A | 6/2003 |
| JP | 2005-187714 A | 7/2005 |
| JP | 2005-521772 A | 7/2005 |
| JP | 2011-26470 A | 2/2011 |
| JP | 2011-127100 A | 6/2011 |
| JP | 2012-525466 A | 10/2012 |
| JP | WO2015/060335 A1 | 4/2015 |
| JP | 2017-002147 A | 1/2017 |
| KR | 10-2001-0106071 A | 11/2001 |
| KR | 10-2005-0002896 A | 1/2005 |
| KR | 1020090068771 A | 6/2009 |
| KR | 10-2012-0023697 A | 3/2012 |
| KR | 10-1551562 B1 | 9/2015 |
| KR | 10-2016-0059287 A | 5/2016 |
| KR | 2016-0059287 A † | 5/2016 |
| KR | 10-2016-0078378 A | 7/2016 |
| KR | 10-1842247 B1 | 3/2018 |
| KR | 10-2019-0107562 A | 9/2019 |
| WO | 03/082979 A1 | 10/2003 |
| WO | 2010/126561 A1 | 11/2010 |

OTHER PUBLICATIONS

International Search Report for PCT/KR2021/010685 dated, Nov. 30, 2021 (PCT/ISA/210).

* cited by examiner
† cited by third party

*Primary Examiner* — Robert T Butcher
(74) *Attorney, Agent, or Firm* — Sughrue Mion, PLLC

(57) ABSTRACT

The present disclosure relates to a method for preparing a copolyester. More specifically, the present disclosure relates to a method for preparing a copolyester that reduces the use of a cobalt-based coloring agent but minimizes yellowing, by using a specific thermal stabilizer.

12 Claims, No Drawings

METHOD FOR PREPARING A COPOLYESTER

CROSS-REFERENCE TO RELATED APPLICATION(S)

This application is a National Stage of International Application No. PCT/KR2021/010685 filed Aug. 11, 2021, claiming priority based on Korean Patent Application No. 10-2020-0124994 filed on Sep. 25, 2020 with the Korean Intellectual Property Office, the disclosures of which are herein incorporated by reference in their entirety.

BACKGROUND OF THE INVENTION

(a) Field of the Invention

The present disclosure relates to a method for preparing a copolyester. More specifically, the present disclosure relates to a method for preparing a copolyester that reduces the use of a cobalt-based coloring agent but minimizes yellowing, by using a specific thermal stabilizer.

(b) Description of the Related Art

A polyester resin has excellent mechanical and chemical properties, and thus, has been used in a variety of applications, for example, in the fields of drinking water containers, medical or food package materials, food containers, sheets, films, automobile molded products, and the like, from the past.

As a representative polyester resin, polyethylene terephthalate(PET) polymerized using terephthalic acid as a dicarboxylic acid component and ethyleneglycol as a glycol component may be mentioned, and it is being widely used due to excellent physical and chemical properties and dimensional stability, and the like.

However, the polyethylene terephthalate resin is a crystalline resin and has low transparency, and thus, has limited applications for sheets, films, food package papers, and cosmetic containers, and the like, which require transparency.

Meanwhile, a copolyester resin copolymerized using CHDM(1,4-cyclohexanedimethanol) as comonomers of the glycol component, in addition to terephthalic acid and ethyleneglycol, is referred to as glycol modified polyethylene terephthalate (PETG), and the PETG resin is a non-crystalline resin, and has the advantage for preparing transparent and thick films or containers, which are difficult to prepare using the existing PET resin. The PETG resin can produce transparent molded products of various thicknesses without whitening due to crystallization, and besides, it has advantages of bright color, excellent gloss, and excellent printability, impact resistance and chemical resistance, and easy secondary processing.

However, the PETG resin, due to high catalyst activity during a polymerization process, has a problem of yellowing caused by side reactions, and thus, studies to solve the problem are continuing.

SUMMARY OF THE INVENTION

In order to solve the problem of the prior art, it is an object of the invention to provide a method for preparing a copolyester resin that uses a specific thermal stabilizer, thereby reducing the use of a cobalt-based coloring agent but minimizing yellowing, thus preparing a copolyester resin having excellent color and transparency.

In order to achieve the object, there is provided herein a method for preparing a copolyester comprising steps of:

conducting an esterification reaction of terephthalic acid, ethyleneglycol, and 1,4-cyclohexanedimethanol (CHDM), in the presence of a titanium-based catalyst; and conducting condensation polymerization of the reaction product of the esterification reaction, in the presence of a phosphorus-based thermal stabilizer, wherein the phosphorus-based thermal stabilizer is calcium bis[monoethyl(3,5-di-tert-butyl-4-hydroxylbenzyl)phosphonate] or triethyl phosphonoacetate.

According to the preparation method of the invention, by using a specific thermal stabilizer, the use of a cobalt-based coloring agent is reduced but yellowing is minimized, thus preparing a copolyester resin having excellent color and transparency.

Thus, the copolyester resin obtained by the preparation method of the invention has excellent properties such as transparency, color, and the like, and thus, can be usefully applied, although not limited thereto, particularly for containers relating to cosmetics, food and beverages, and shrink films, sheets and various molded products, and the like.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended.

And, in case it is stated that each layer or element is formed "on" or "above" each layer or element, it means that each layer or element is formed right above each layer or element, or that other layers or elements may be additionally formed between the layers or on the object or substrate.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, a method for preparing a copolyester according to the invention will be explained in detail.

The method for preparing a copolyester according to one embodiment of the invention comprises steps of: conducting an esterification reaction of terephthalic acid, ethyleneglycol, and 1,4-cyclohexanedimethanol(CHDM), in the presence of a titanium-based catalyst; and conducting condensation polymerization of the reaction product of the esterification reaction, in the presence of a phosphorus-based thermal stabilizer, wherein the phosphorus-based thermal stabilizer is calcium bis[monoethyl(3,5-di-tert-butyl-4-hydroxylbenzyl)phosphonate] or triethyl phosphonoacetate.

More specifically, first, terephthalic acid, ethyleneglycol, and 1,4-cyclohexanedimethanol(CHDM) are subjected to an esterification reaction.

In general, a polyester resin is a polymer synthesized through an esterification reaction and a condensation polymerization reaction using dicarboxylic acid components and glycol components as monomers. Polyethylene terephthalate(PET), one of such polyester, is a resin polymerized using terephthalic acid as the dicarboxylic acid component and ethyleneglycol as the glycol components, and is a representative crystalline resin being commercially produced in the art.

However, a polyethylene terephthalate resin is a crystalline resin and has low transparency, and thus, has limited applications for sheets, films, food packing papers, and cosmetic containers, and the like, which require transparency.

Meanwhile, a copolyester resin copolymerized using CHDM(1,4-cyclohexanedimethanol) as comonomers of the glycol components in addition to terephthalic acid and ethyleneglycol, is referred to as glycol modified polyethylene terephthalate(PETG), and the PETG resin is a non-crystalline resin, and has the advantage for preparing transparent and thick films or containers, which are difficult to prepare using the existing PET resin. The PETG resin can produce transparent molded products of various thicknesses without whitening due to crystallization, and besides, it has advantages of bright color, excellent gloss, and excellent printability, impact resistance and chemical resistance, and easy secondary processing.

The preparation method of the invention aims to prepare a copolyester resin, more specifically, glycol modified polyethylene terephthalate(PETG) polymerized using 1,4-cyclohexanedimethanol (CHDM) as comonomers of a glycol component, in addition to terephthalic acid and ethyleneglycol.

According to one embodiment of the invention, in addition to the terephthalic acid as a dicarboxylic acid component, other dicarboxylic acids may be additionally used within a range where the object of the invention is not hindered.

According to one embodiment of the invention, in addition to the ethyleneglycol and cyclohexanedimethanol as the glycol components, other glycols may be used within a range where the object of the invention is not hindered.

The mole ratio of the dicarboxylic acid components comprising terephthaic acid and glycol components comprising ethyleneglycol and cyclohexanedimethanol may be about 1:1 to about 1:2. Theoretically, for an esterification reaction, dicarboxylic acid components and glycol components react at a mole ratio of 1:1, but when the mole ratio of dicarboxylic acid components and glycol components are within the above range, effective esterification reaction may occur.

According to one embodiment of the invention, cyclohexanedimethanol may be included in the content of about 10 mol % or more, or about 20 mol % or more, or about 30 mol % or more, and 90 mol % or less, or about 80 mol % or less, or about 70 mol % or less, or about 50 mol % or less, based on 100 mol % of the total glycol components. If the mole ratio of the cyclohexanedimethanol is too small, the properties of glycol modified PET resin polymerized may not be properly exhibited, and if the cyclohexanedimethanol is included in an excessive amount, crystallization of the polymerization product may occur. In this respect, it may be preferable that the cyclohexanedimethanol is included in the aforementioned range.

In the preparation method of a copolyester, the step of subjecting terephthalic acid, ethyleneglycol, and 1,4-cyclohexanedimethanol(CHDM) to an esterification reaction is conducted in the presence of a titanium-based catalyst. The titanium-based catalyst may be, for example, tetraethyltitanate, acetyltripropyltitanate, tetrapropyltitanate, tetrabutyltitanate, polybutyltitanate, 2-ethylhexyl titanate, octylene glycol titanate, lactate titanate, triethanolamine titanate, acetylacetonate titanate, ethylacetoacetic ester titanate, isostearyl titanate, or titanium dioxide, but the invention is not limited thereto.

The titanium-based catalyst may be introduced in such an amount that the total content of titanium included in the titanium-based catalyst may become about 5 ppm or more, or about 10 ppm or more, or about 15 ppm or more, and about 200 ppm or less, or about 150 ppm or less, or about 100 ppm or less, based on the weight of the finally produced copolyester. If the total content of titanium is too small, it may be difficult to exhibit sufficient catalyst activity, and thus, a polymerization time may lengthen, and to the contrary, if it is too large, yellowing may be caused due to side reactions, and a catalyst cost may increase.

According to one embodiment of the invention, the step of subjecting terephthalic acid, ethyleneglycol, and 1,4-cyclohexanedimethanol to an esterification reaction may be conducted at a temperature of about 220 to about 270° C., preferably about 240 to about 260° C., for about 1 to about 10 hours, preferably about 2 to about 5 hours. If the temperature of the esterification reaction is less than 220° C., a reaction time may lengthen, and the long reaction time may increase the possibility of yellowing of prepared polyester resin. To the contrary, if the temperature of the esterification reaction is greater than 270° C., there may be a problem of yellowing due to the high reaction temperature.

The esterification reaction may be conducted batchwise or continuously, and the terephthalic acid, ethyleneglycol, and 1,4-cyclohexanedimethanol may be introduced separately, or may be mixed and introduced.

Next, a step of subjecting the reaction product of the esterification reaction to condensation polymerization in the presence of a phosphorus-based thermal stabilizer, is conducted.

According to the preparation method of the invention, in order to decrease thermal decomposition of a copolyester, a phosphorus-based thermal stabilizer is introduced in the condensation polymerization reaction step, and as the phosphorus-based thermal stabilizer, calcium bis[monoethyl(3,5-di-tert-butyl-4-hydroxylbenzyl)phosphonate]) or triethyl phosphonoacetate is used.

The thermal stabilizer inhibits the production of a color body generated by heat during the esterification reaction and condensation polymerization reaction, or controls catalyst activity to inhibit unintended addition reactions, and exhibits thermal decomposition prevention effect during solid state polymerization to inhibit yellowing of the finally formed polyester, thus making it transparent and almost colorless.

According to the preparation method of the invention, when preparing a copolyester resin, by using a phosphorus-based thermal stabilizer with a specific structure, the disadvantage of the titanium-based catalyst vulnerable to discoloration is remedied, thus inhibiting yellowing of the finally formed copolyester to improve color and transparency.

In the prior art, triethyl phosphate(TEP) was mainly used as a phosphorus-based thermal stabilizer, but in case triethyl phosphate is used as a thermal stabilizer when preparing a glycol modified PET resin, color property may not be sufficiently improved.

Thus, in the present disclosure, it was confirmed that in case, among phosphorus-based thermal stabilizers, calcium bis[monoethyl(3,5-di-tert-butyl-4-hydroxylbenzyl)phosphonate] or triethyl phosphonoacetate is used, very excellent color property may be exhibited when preparing a glycol modified PET resin, and the invention has been completed.

When using calcium bis[monoethyl(3,5-di-tert-butyl-4-hydroxylbenzyl)phosphonate] as the phosphorus-based compound, the phosphorus-based compound may be introduced in such an amount that the content of phosphorus element included in the calcium bis[monoethyl(3,5-di-tert-butyl-4-hydroxylbenzyl)phosphonate] may become about 50 ppm or more, or about 100 ppm or more, or about 300 ppm or more, and about 1,000 ppm or less, or about 900 ppm or less, or about 850 ppm or less, based on the weight of the finally produced copolyester. It may be preferable in terms of prevention of thermal decomposition and viscosity increase to add the calcium bis[monoethyl(3,5-di-tert-butyl-4-hydroxylbenzyl)phosphonate] in the aforementioned range.

And, when using triethyl phosphonoacetate as the phosphorus-based compound, the phosphorus-based compound may be introduced in such an amount that the content of phosphorus element included in the triethyl phosphonoacetate may become about 5 ppm or more, or about 10 ppm or more, or about 15 ppm or more, and about 100 ppm or less, or about 80 ppm or less, or about 50 ppm or less, base don the weight of the finally produced copolyester. It may be preferable in terms of prevention of thermal decomposition and viscosity increase to add triethyl phosphonoacetate in the aforementioned range.

And, according to one embodiment of the invention, in order to improve color, a cobalt-based coloring agent may be additionally added. As the examples of the cobalt-based coloring agent, cobalt-based compounds such as cobalt acetate, cobalt acetylacetonate, cobalt benzoylacetonate, cobalt hydroxide, cobalt bromide, cobalt chloride, cobalt iodide, cobalt fluoride, cobalt cyanide, cobalt nitrate, cobalt sulfate, cobalt selenide, cobalt phosphate, cobalt oxide, cobalt thiocyanate or cobalt propionate may be mentioned, but the invention is not limited thereto.

The cobalt-based coloring agent may be introduced in such an amount that the content of cobalt element may become about 3 ppm or more, or about 5 ppm or more, or about 7 ppm or more, and about 100 ppm or less, or about 90 ppm or less, or about 70 ppm or less, based on the weight of the finally produced copolyester. When adding the cobalt compound within the aforementioned range, coloring may be inhibited without deterioration of brightness or thermal stability of copolyester.

And, in the present disclosure, the cobalt compound may be introduced in any step, without limited to the esterification reaction step or condensation polymerization step.

The step of condensation polymerization of the reaction product of the esterification reaction may be conducted at a temperature of about 250 to about 300° C., preferably about 260 to about 290° C. for about 30 minutes to about 6 hours, preferably about 1 to about 4 hours. If the condensation polymerization reaction is progressed at a temperature less than 250° C., a reaction time may lengthen, and low molecular copolyester may be formed, and the long reaction time may increase a probability of yellowing of the prepared polyester resin, and if it is progressed at a temperature greater than 300° C., there may be a problem of yellowing due to the high reaction temperature.

And, the step of condensation polymerization of the reaction product of the esterification reaction may be conducted under reduced pressure condition of about 760 to about 1 mmHg, preferably about 760 to about 0.01 mmHg. When conducting a condensation polymerization reaction under such a reduced pressure condition, by-products produced during the condensation polymerization reaction may be sufficiently removed outside the reaction system.

The copolyester resin obtained according to the preparation method of the invention may exhibit intrinsic viscosity (IV) in the range of about 0.5 to about 1.0 dl/g.

The copolyester obtained according to the preparation method of the invention may have a color b value of 0 or less, for example, 0 or less, or −0.3 or less, or −0.5 or less, and −3.5 or more, or −3.2 or more, or −3 or more, when the intrinsic viscosity(IV) is 0.65 to 0.74 dl/g, The copolyester obtained according to the preparation method of the invention may have a color b value of 5 or less, for example, 5 or less, or 4.5 or less, or 0 or less, and −8.0 or more, or −7.5 or more, or −7.0 or more, when the intrinsic viscosity(IV) is 0.75 to 0.80 dl/g.

As such, in the copolyester obtained according to the preparation method of the invention, yellowing is inhibited, and it exhibits high degree of blue discoloration, which is preferred by products.

A L, a, and b color system is being internationally applied as a standard for evaluating the color of polyester. Such a color system is one of color systems for the standardization of color measurement, and describes recognizable colors and color difference. In this system, L is a brightness factor, and a and b are color measuring numbers. In general, the b value indicating yellow/blue balance is an important numerical value in the manufacture of drinking water containers and food package materials. A positive b value means yellow discoloration and a negative b value means blue discoloration. And, a positive a value means red discoloration and a negative a value means green discoloration. And, the L value is a numerical factor indicating brightness, and is very important in the manufacture of drinking water containers and food package materials like the b value.

The use of the copolyester prepared according to the preparation method of the invention is not specifically limited, but may be widely used particularly for food package materials, bottles, films or fibrous plastics requiring excellent transparency, brightness, color conditions. More specifically, it may be used in containers relating to cosmetics, beverage, food, and shrink films, sheets and various molded products requiring transparency.

Hereinafter, the invention will be explained in more detail with reference to examples. However, these examples are presented only as the illustrations of the invention, and the scope of the right of the invention is not determined thereby.

EXAMPLE

Example 1

1162 g of terephthalic acid, 412 g of ethylene glycol, 302 g of 1,4-cyclohexanedimethanol, and a titanium-based catalyst were put in a reactor, and the reactor was replaced with nitrogen atmosphere, and then, the mixture was stirred and heated to slowly raise the temperature to 250° C., and reacted at 1 barg for 2 hours.

During the reaction process, the temperature of the top of the column was maintained at 125° C. or less, and when discharge of water was not progressed any longer, the pressure was slowly reduced to discharge all the water produced in the reactor outside the system.

And then, Irganox 1425(830 ppm, based on the final copolyester) and cobalt acetate(20 ppm, based on the final copolyester) were introduced in the reactor.

The mixture was stirred additionally for 30 minutes, and then, transferred to a reactor equipped with a heating system and a stirrer, capable of decompression, and then, the pressure inside the reactor was gradually reduced from 760 mmHg to 5 mmHg over 80 minutes while stirring, and a reaction was progressed while gradually raising the temperature until the temperature of the final polymerization product became 267° C.

And then, a vacuum capacity was increased to the maximum to finally reach 0.5 mmHg, the reaction temperature was raised to 270° C., and a reaction was progressed. And then, when the aimed viscosity was reached, the reaction was finished. The obtained copolyester polymerization product was discharged, cooled and cut to prepare in the form of pellet, and then, viscosity, color, molecular weight, and the like were analyzed.

Examples 2 to 4 and Comparative Examples 1 to 2 were conducted while changing the content of cobalt acetate, the kind and content of phosphorus-based thermal stabilizer, polymerization time, viscosity, and the like in Example 1.

The process conditions of the Examples 1 to 4 and Comparative Examples 1 to 2 are summarized and shown in the following Table 1

TABLE 1

| | Titanium catalyst (unit: ppm) | Cobalt acetate (unit: ppm) | Phosphorus-based thermal stabilizer (unit: ppm) | Polymerization time at 0.5 mmHg (unit: min) |
|---|---|---|---|---|
| Example 1 | 20 | 20 | Irganox 1425, 830 ppm | 68 |
| Example 2 | 20 | 40 | TEPa, 20 ppm | 110 |
| Comparative Example 1 | 20 | 40 | TEP, 20 ppm | 79 |
| Example 3 | 20 | 20 | Irganox 1425, 830 ppm | 49 |
| Example 4 | 20 | 40 | TEPa, 20 ppm | 90 |
| Comparative Example 2 | 20 | 40 | TEP, 20 ppm | 56 |

1) In Table 1, the contents of the titanium-based catalyst, cobalt acetate and phosphorus-based thermal stabilizer mean the contents of each element(Ti, Co, P), based on the finally produced copolyester.
2) Irganox 1425 denotes calcium bis[monoethyl(3,5-di-tert-butyl-4-hydroxylbenzyl)phosphonate], TEP denotes triethyl phosphate, and TEPa denotes triethyl phosphonoacetate.
3) The polymerization time means a condensation polymerization reaction time under full vacuum of 0.5 mmHg or less.

Experimental Example

Measurement Method

1) Intrinsic Viscosity(I.V)

In 100 mL of a reagent in which phenol and 1,1,2,2-tetrachloroethanol were mixed at a weight ratio of 6:4, 0.4 g of a resin to be measured was put, and dissolved for 90 minutes, and then, transferred to Ubbelohde viscometer, and maintained in a 30° C. constant-temperature bath for 10 minutes, and using the viscometer and aspirator, the number of seconds of drop of the solution was obtained. The number of seconds of drop of the solvent was obtained by the same method, and then, R.V value and I.V value were calculated by the following Calculation Formulas 1 and 2. In the following Calculation Formula, C denotes the concentration of a sample.

$$R.V = \text{number of seconds of drop of sample/number of seconds of drop of solvents} \quad \text{[Calculation Formula 1]}$$

$$I.V = \tfrac{1}{4}(R.V-1)/C + \tfrac{3}{4}(\ln R.V/C) \quad \text{[Calculation Formula 2]}$$

2) Resin Color (Color=L, a, b)

50 g of resin to be measured was removed of moisture in the air, and then, put in a colorimeter model SA-2000, and the color was measured 10 times and the mean value was selected.

3) Weight Average Molecular Weight (Mw) and Number Average Molecular Weight (Mn)

Using gel permeation chromatography(GPC), weight average molecular weight(Mw) and number average molecular weight(Mn) were respectively measured.

The intrinsic viscosities, Color values (L, b), weight average molecular weight (Mw) and number average molecular weights (Mn) of the copolyester resins obtained in Examples 1 to 4 and Comparative Examples 1 to 2 were measured and shown in the following Table 2.

TABLE 2

| | I.V (dl/g) | Color | | | Mn (g/mol) | Mw (g/mol) |
|---|---|---|---|---|---|---|
| | | L | a | b | | |
| Example 1 | 0.78 | 63.2 | 1.7 | −3.5 | 36,800 | 65,200 |
| Example 2 | 0.76 | 67.9 | −0.38 | 4.5 | 45,600 | 72,000 |
| Comparative Example 1 | 0.78 | 59.8 | −1.3 | 12 | 34,900 | 65,000 |
| Example 3 | 0.66 | 63.2 | 1.1 | −3 | 32,100 | 55,400 |
| Example 4 | 0.69 | 61 | 1.8 | −0.6 | 36,500 | 56,600 |
| Comparative Example 2 | 0.72 | 61.1 | −0.4 | 6.2 | 33,600 | 60,300 |

Referring to Tables 1 and 2, the copolyester resins of Examples prepared using specific phosphorus-based thermal stabilizers according to the preparation method of the invention, compared to those of Comparative Examples prepared using triethyl phosphate as a thermal stabilizer according to the conventional method, exhibited excellent color properties in the same viscosity ranges.

What is claimed is:

1. A method for preparing a copolyester comprising steps of:

conducting an esterification reaction of terephthalic acid, ethyleneglycol, and 1,4-cyclohexanedimethanol (CHDM), in the presence of a titanium-based catalyst; and conducting condensation polymerization of the reaction product of the esterification reaction, in the presence of a phosphorus-based thermal stabilizer, wherein the phosphorus-based thermal stabilizer is calcium bis[monoethyl(3,5-di-tert-butyl-4-hydroxylbenzyl)phosphonate] or triethyl phosphonoacetate, wherein, when using calcium bis[monoethyl(3,5-di-tert-butyl-4-hydroxylbenzyl)phosphonate] as the phosphorous-based thermal stabilizer, the phosphorous-based thermal stabilizer is added in an amount such that a content of phosphorous element is 300 ppm or more and 1,000 ppm or less, based on a weight of a finally produced copolyester, and wherein, when using triethyl phosphonoacetate as the phosphorous-based thermal stabilizer, the phosphorous-based thermal stabilizer is added in an amount such that a content of phosphorous element is 5 ppm or more and 20 ppm or less, based on the weight of the finally produced polyester.

2. The method for preparing a copolyester according to claim 1, wherein the titanium-based catalyst comprises one or more selected from the group consisting of tetraethyltitanate, acetyltripropyltitanate, tetrapropyltitanate, tetrabutyltitanate, polybutyltitanate, 2-ethylhexyl titanate, octylene glycol titanate, lactate titanate, triethanolamine titanate, acetylacetonate titanate, ethylacetoacetic ester titanate, isostearyl titanate, and titanium dioxide.

3. The method for preparing a copolyester according to claim 1, wherein the titanium-based catalyst is added in an amount such that the content of titanium element is 5 ppm or more and 200 ppm or less, based on the weight of the finally produced copolyester.

4. The method for preparing a copolyester according to claim 1, wherein the step of reacting terephthalic acid, ethyleneglycol, and 1,4-cyclohexanedimethanol is conducted at a temperature of 200 to 270° C. for 1 to 10 hours.

5. The method for preparing a copolyester according to claim 1, further comprising a cobalt-based coloring agent, in the condensation polymerization step.

6. The method for preparing a copolyester according to claim 5, wherein the cobalt-based coloring agent comprises one or more selected from the group consisting of cobalt acetate, cobalt acetylacetonate, cobalt benzoylacetonate, cobalt hydroxide, cobalt bromide, cobalt chloride, cobalt iodide, cobalt fluoride, cobalt cyanide, cobalt nitrate, cobalt sulfate, cobalt selenide, cobalt phosphate, cobalt oxide, cobalt thiocyanate and cobalt propionate.

7. The method for preparing a copolyester according to claim 5, wherein the cobalt-based coloring agent is used in an amount such that the content of cobalt element included in the cobalt-based coloring agent is 3 ppm or more and 100 ppm or less, based on the weight of the finally produced copolyester.

8. The method for preparing a copolyester according to claim 1, wherein the step of condensation polymerization of the reaction product of the esterification reaction is conducted at a temperature of 250 to 300° C. and a reduced pressure of 760 to 0.01 mmHg for 30 minutes to 6 hours.

9. The method for preparing a copolyester according to claim 1, wherein, the copolyester has an intrinsic viscosity (IV) of 0.65 to 0.74 dl/g and a color b value of −3.5 or more and 0 or less.

10. The method for preparing a copolyester according to claim 1, wherein the copolyester has an intrinsic viscosity (IV) of 0.75 to 0.80 dl/g and a color b value of −8.0 or more and 5 or less.

11. A copolyester prepared by the method according to claim 1.

12. The copolyester according to claim 11, wherein the copolyester is suitable for cosmetics, beverage, food-related containers, shrink films, or sheets.

* * * * *